(12) United States Patent
Sugerman

(10) Patent No.: US 7,364,611 B2
(45) Date of Patent: Apr. 29, 2008

(54) FAST DRYING COATINGS

(75) Inventor: Gerald Sugerman, Allendale, NJ (US)

(73) Assignee: Vocfree, Inc., Hackensack, NJ (US)

( * ) Notice: Subject to any disclaimer, the term of this patent is extended or adjusted under 35 U.S.C. 154(b) by 270 days.

(21) Appl. No.: 10/653,867

(22) Filed: Sep. 3, 2003

(65) Prior Publication Data
US 2004/0143031 A1 Jul. 22, 2004

Related U.S. Application Data

(60) Provisional application No. 60/408,916, filed on Sep. 5, 2002.

(51) Int. Cl.
*C09D 11/00* (2006.01)
(52) U.S. Cl. .............. 106/31.13; 106/31.27; 106/31.6; 106/31.58; 106/31.86
(58) Field of Classification Search ............. 106/31.13, 106/31.27, 31.6, 31.58, 31.86
See application file for complete search history.

(56) References Cited

U.S. PATENT DOCUMENTS

| | | | | |
|---|---|---|---|---|
| 3,804,640 A | * | 4/1974 | Buckwalter | .............. 106/31.67 |
| 5,156,674 A | | 10/1992 | Cells | |
| 5,431,721 A | * | 7/1995 | Pennaz et al. | .............. 524/251 |
| 5,549,741 A | * | 8/1996 | Pennaz et al. | ................ 524/77 |
| 5,552,467 A | * | 9/1996 | Reiter et al. | ................ 524/270 |
| 5,859,268 A | | 1/1999 | Angelici et al. | |
| 5,965,633 A | * | 10/1999 | Revol | ......................... 523/160 |
| 2004/0009294 A1 | | 1/2004 | Kuribayashi et al. | |

FOREIGN PATENT DOCUMENTS

| | | |
|---|---|---|
| EP | 0 503 897 A1 | 3/1992 |
| EP | 0 731 150 A1 | 9/1996 |

OTHER PUBLICATIONS

International Search Report for PCT/US03/27572; mailed Mar. 4, 2004.

* cited by examiner

*Primary Examiner*—J. A. Lorengo
*Assistant Examiner*—Veronica Faison-Gee
(74) *Attorney, Agent, or Firm*—Myers Wolin, LLC

(57) ABSTRACT

Novel, rapidly drying, low volatile organic compound (VOC), minimal dot gain coatings, (including lithographic ink and varnish systems) are herein described. These systems dry sufficiently rapidly, that their usage eliminates ink drying speed as the rate limiting factor in most lithographic printing applications. In addition to providing enhanced drying rates as compared with their conventional counterparts, the rapid drying, low/no VOC lithographic coating systems of the instant invention can provide the user with significant improvement in dried film rub resistance.

20 Claims, No Drawings

FAST DRYING COATINGS

CROSS-REFERENCE TO RELATED APPLICATIONS

This application claims benefit of U.S. application Ser. No. 60/408,916, filed Sep. 5, 2002, which is incorporated by reference in its entirety.

BACKGROUND

Conventionally, lithographic (litho) inks, and varnishes have been designed to dry via combination of solvent evaporation and oxidative polymerization of unsaturated components.

Consequent to increasing concerns regarding the health, safety, and environmental impacts of volatile organic compounds, (VOCs); the contribution of this component (the evaporation of solvent is presently responsible for the major proportion of conventional litho inks' and varnish's drying speeds) to drying rates is anticipated to shrink in the future, as increasingly stringent limitations are placed on the usage of VOCs. Stacking of fresh prints in order to conserve space, which is typical during long runs, frequently limits the efficacy of solvent evaporation as a drying mechanism. Additionally the incorporation of solvents in litho inks results in undesirable distortion (e.g., capillary spread prior to drying) of applied ink droplets (dot gain), thus limiting print resolution. The extent of dot gain beyond that consequent to mechanical gain tends to be roughly proportional to the percentage of VOCs employed, hence solvent incorporation into litho ink formulations often limits print quality.

The oxidative-polymerization component of the drying of present (commercially useful) litho inks almost invariably requires acceleration by toxic heavy metals such as cobalt and manganese, and is often kinetically limited by oxygen availability, especially when printing on essentially non-porous surfaces, and/or when fresh prints are stacked tightly, minimizing air access. A number of technologies have been developed to overcome drying rate limitations of conventional litho inks; these acceleration techniques include, the inclusion of various energy input systems, such as thermal energy (heatset, and infrared drying), electron beam (EB), and ultraviolet (UV) radiation. The latter methodology typically requires incorporation of substantial proportions of a combination of expensive, and often-toxic photo initiators, and related auxiliaries, in addition to the expensive hardware, intensive energy consumption, and radiation exposure hazards, implicit in the generation of short wave length radiation used in both EB and UV based curing systems.

U.S. Pat. No. 5,552,467 teaches the usage of thermally activated combinations of chemical reducing agents, and organic (hydro)peroxides, one placed in the ink and the other contained in fountain solution as a means of overcoming the oxidative-polymerization drying component rate limitations of heat set lithographic inks. The patent discloses the use of two-part systems that inherently exclude usage in single fluid inks, and is limited further limited by the reactivity of the components, resulting in relatively short shelf life of solutions and/or dispersions of many organic (hydro)peroxides, and of reducing agents in unsaturated oil based vehicles, especially those containing carbon black an/or heavy metal based pigments, and in gum containing fountain solution concentrates. The specified technology has not been claimed to be effective for use in systems which must dry at/or near ambient temperatures.

U.S. Pat. No. 5,173,113 teaches the utility of hydrogen peroxide as a fountain solution additive for the acceleration of drying of lithographic inks, by a factor of approximately twofold. This combination, however, is used as a two-part system, thus inherently precluding use in single fluid inks, and is also limited by the severe instability of hydrogen peroxide in the presence of many variable valence metals.

U.S. Pat. No. 5,156,674 teaches the utility of combinations of sodium perborate (which rapidly hydrolyzes on contact with water to produce hydrogen peroxide) and zirconium salts as lithographic fountain solution drying accelerators.

It has now been surprisingly found that incorporation of low to moderate percentages of multifunctional 2, 5-bis (preferably unsaturated) fatty acid esters of 1,4-bis oxa-2, 5-cyclohexadiene-2,5-diols, (meth)acrylates, allyl and/or vinyl ethers into otherwise conventional lithographic inks and varnishes (2 to about 30 weight percent), both significantly enhances the drying rates of these inks and enhances the utility of low levels (10 to 5,000 parts-per million (ppm)) of peroxy acid salts, (cofactor reducing agents are not required) as replacements for the thermally activated organic (hydro)peroxide-reducing agent combination(s) and/or hydrogen peroxide as fountain solution additive drying accelerators previously disclosed.

SUMMARY

The invention relates to compositions, methods of making the compositions, and methods of using the compositions for coating applications. The coatings are suitable as inks, varnishes, paints, and the like. In one aspect the coatings are fast drying, relative to existing technologies, and offer other advantages (e.g., print quality, color fastness, reduced or no VOC components, reduced or no toxic metal-containing components) useful in print and coatings applications.

The compositions of the invention incorporate moderate percentages of a combination of multifunctional 2, 5-bis (preferably unsaturated) fatty acid esters of 1,4-bis oxa-2, 5-cyclohexadiene-2,5-diols, (meth)acrylates, allyl and/or vinyl ethers in lithographic inks and varnishes (2 to about 30 weight percent), including into otherwise conventional lithographic inks, and related vehicles and varnishes.

In one aspect, the invention is a composition (and methods of using them) having one or more 2,5-bis fatty acid esters of 1,4-bis oxa-2,5-cyclohexadiene-2,5-diols, and any of one or more multifunctional (meth)acrylates, vinyl ethers, or a combination thereof, wherein the amount of (meth) acrylate is less than 10 weight percent, (e.g., about 1 to 7 weight %, about 3 to 5 weight %, less than any integer % between 1 and 10%) of the total composition. The composition can be one having a minimum of about 2% and a maximum of about 30 weight percent of a combination of one or more 2,5-bis fatty acid esters of 1,4-bis oxa-2,5-cyclohexadiene-2,5-diols, and one or more of any of multifunctional (meth)acrylates, vinyl ethers, or a combination thereof. In another embodiment, the composition includes at least one (meth)acrylate.

In other aspects, the compositions (and methods) delineated herein can be those: having one or more 2,5-bis unsaturated fatty acid ester of 1,4-bis oxa-2,5-cyclohexadiene-2,5-diol; further having one or more inorganic salts of a peracid; having from about 10 to about 5,000 parts per million (ppm) of an inorganic salt of a peracid. In other aspects, the compositions (and methods) delineated herein can further include pigments; can further have one or more additional ink vehicle components (e.g., solids, alkyds, polyesters or polyamides); can further include water; or can have one or more compounds delineated in any of the tables herein (e.g., Tables A-C or 1-4).

In another aspect, the invention relates to an ink having any of the compositions delineated herein, including those having one or more 2,5-bis fatty acid esters of 1,4-bis oxa-2,5-cyclohexadiene-2,5-diols, and one or more of any of multifunctional (meth)acrylates, vinyl ethers, or a combination thereof, wherein the amount of (meth)acrylate is less than 10 weight percent, (e.g., about 1 to 7 weight %, about 3 to 5 weight %, less than any integer % between 1 and 10%) of the total composition.

Another aspect of the invention is a method of printing including using an ink having any of the compositions delineated herein, including those having one or more 2,5-bis fatty acid esters of 1,4-bis oxa-2,5-cyclohexadiene-2,5-diols, and one or more of any of multifunctional (meth)acrylates, vinyl ethers, or a combination thereof, wherein the amount of (meth)acrylate is less than 10 weight percent, (e.g., about 1 to 7 weight %, about 3 to 5 weight %, less than any integer % between 1 and 10%) of the total composition. The method can further include applying the ink to a press; can be lithographic, letterpress, flexo, gravure, etc.

In another aspect, the invention is a method of printing including using any of the compositions delineated herein, including those having one or more 2,5-bis fatty acid esters of 1,4-bis oxa-2,5-cyclohexadiene-2,5-diols, and one or more of any of multifunctional (meth)acrylates, vinyl ethers, or a combination thereof, wherein the amount of (meth)acrylate is less than 10 weight percent, (e.g., about 1 to 7 weight %, about 3 to 5 weight %, less than any integer % between 1 and 10%) of the total composition, as an ink vehicle. The method can further include that wherein the ink vehicle is mixed with a fountain solution, or that wherein the fountain solution further includes an organic (hydro)peroxide or an inorganic salt of a peracid. The method can further include contacting the composition or ink vehicle delineated herein with a fountain solution immediately prior to use in printing or immediately prior to application to a printing press. The method can further include contacting the composition or ink vehicle delineated herein with water (e.g., air, water source, other moisture source) immediately prior to use in printing or immediately prior to application to a printing press.

Another aspect of the invention is a composition made by the process of combining one or more 2,5-bis fatty acid ester of a 1,4-bis oxa-2,5-cyclohexadiene-2,5-diol, and one or more of any of multifunctional (meth)acrylates, vinyl ethers, or a combination thereof, wherein the amount of (meth)acrylate is less than 10 weight percent of the total composition. The method can further include combining one or more additional compounds delineated herein (e.g., an inorganic salt of a peracid or an organic hydroperoxide).

In one aspect, the compositions are any of those delineated herein wherein they have reduced levels (relative to conventional amounts, e.g., <1 weight %, 0.05 to 0.7 weight %, of metal), or are devoid of, toxic heavy metals (e.g., cobalt, manganese), including in elemental or salt forms.

Preferred embodiments of the instant invention include those litho ink formulations which incorporate from about 2 to about 12 weight percent of 2, 5-bis (preferably unsaturated) fatty acid esters of 1,4-bis oxa-2,5-cyclohexadiene-2, 5-diols, in addition to 2 to about 15 weight percent of one or more essentially non-volatile multifunctional (meth)acrylates and/or vinyl ethers in combination with the free radical sources described above. Examples of the new and novel bis oxa-cyclohexadiene diol bis esters, which conform to the generic Formula A (below); examples of same are provided in Table B. Multifunctional (meth)acrylates and vinyl ethers useful in the practice of this invention are legion; however, for the sake of brevity, ten examples of each are cited in Table B, and C respectively. These examples are intended to be illustrative, and not delimit the scope of this invention.

The introduction of said multifunctional 2, 5-bis (preferably unsaturated) fatty acid esters of 1,4-bis oxa-2,5-cyclohexadiene-2,5-diols, (meth)acrylates and/or vinyl ethers as (optionally partial) solvent replacements, not only substantially enhances the drying acceleration effects of (organic (hydro)peroxide—reducing agent combinations, and/or fountain solution hydrogen peroxide addition, taught by the prior art, but additionally provides significant aesthetic improvements relative to the prior art. These improvements include the minimization of dot gain, and of ghosting (penetration of porous substrates by ink via capillary wetting) and gas ghosting, increased gloss potential, and enhanced pigment dispersion rates. The upgrades enabled via the application of the teachings of this invention permits the formulator to design reduced and/or solvent free litho inks, superior to their conventional, (alkyd-polyester-resin) based solvent borne analogs. The use of inorganic peroxy salts, as opposed to that of either organic(hydro)peroxides, when employed in conjunction with either conventional or single fluid lithographic inks, either in the ink or fountain solution, has been found to minimize formulation stability problems, since most inorganic peroxy salts have minimal solubility in the oil based ink phase, and insufficient oxidation potential to significantly damage fountain solutions and or related concentrates, under normal use and/or storage conditions.

As a practical matter, this invention teaches the use of litho ink systems, which employ low to moderate proportions of multifunctional 2, 5-bis (preferably unsaturated) fatty acid esters of 1,4-bis oxa-2,5-cyclohexadiene-2,5-diols, (meth)acrylates, and/or vinyl ethers preferably in combination with catalytic proportions of peroxy acid salts. These peroxy acid salts may, usefully, be incorporated into the ink and/or into the fountain solution (when employed in wet plate lithography), at levels of the order of about 10 to about 5,000 parts per million (ppm). When said accelerators are activated via readily applicable techniques, e.g. chemically, thermally, and or exposure to radiation, these nascent free radical sources decompose to free radicals which affect rapid polymerization based cure of the ink.

The details of one or more embodiments of the invention are set forth in the accompanying drawings and the description below. Other features, objects, and advantages of the invention will be apparent from the description and drawings, and from the claims.

DETAILED DESCRIPTION

The compositions and methods of the invention relate to coatings, and in one aspect inks. Materials that are standard and conventional in the art are suitable for use in the compositions and methods herein.

Lithographic printing is the art or process of printing from a flat plate in which the desired image is achieved by construction of said plate such that selective adhesion of the printing ink to plate occurs in the desired image area(s), followed by contact transfer of said image either directly, or indirectly to a substrate (e.g., paper, plastic, metal).

Unsaturated fatty acids are defined as materials having the composite structure $HOC(O)(CR^1R^2)_n(^3C=CR^4)m\ R_7$ wherein m is an integer from one to about 5, wherein n is an integer from 3 to about 20, and wherein each of the various R groups (e.g., $R^1$, $R^2$, $R^3$, $R^4$) is independently chosen from among hydrogen or is a monovalent hydrocarbyl group having from one to about four carbon atoms. The various ($CR^1R^2$) and ($R^3C$=$CR^4$) need not be consecutive or in conjugation, but may be connected to each other in any order. Unsaturated fatty acids useful in the compositions and methods herein include, for example, those listed in the tables herein.

(Meth)acrylate esters are herein defined as materials having the general structure [$RCH_2$=$CRC(O)O]nR'$, wherein n is an integer larger than 1; each R is independently chosen from hydrogen, or a $CH_3$ group, and R' is chosen from among hydrocarbyl groups having from two to about 20 carbon atoms each, except that the number of carbon atoms in each R' must equal or exceed n. (Meth)acrylate esters useful in the compositions and methods herein include, for example, those listed in the tables herein.

Inorganic salts of peracids (or peroxy acids) are herein defined as salts of acids containing the structure (O—O$^-$), in which the cation has a positive electrical charge on an atom other than hydrogen, or carbon. Inorganic salts of peracids useful in the compositions and methods herein include, for example, those listed in the tables herein. In some aspects of the invention, the inorganic salts of peracids are used in catalytic amounts (e.g., less than about 0.5 weight percent, less than about 0.25 weight percent, less than about 0.1 weight percent, based on total weight of the composition).

Organic hydroperoxides are defined as an organic compound containing the structure C—O—O(R) wherein R is a chosen from among hydrogen, or a group bonded through carbon to the peroxide oxygen. Organic hydroperoxides useful in the compositions and methods herein include, for example, those listed in the tables herein.

Multifunctional vinyl ethers are herein defined as organic chemicals which contain the structure [RRC=CRO]nR'wherein n is a n integer larger than 1; each R is independently chosen from hydrogen, or a $CH_3$ group, and R' is chosen from among hydrocarbyl groups having from two to about 10 carbon atoms.

A fountain solution is herein defined as an aqueous solution that maintains the hydrophyllic oleo phobic balance of the non-image to the image area on a planographic plate as well as maintaining a protective film to prevent oxidation of the non-image areas.

Pigments are a colored particulate which is essentially insoluble in its vehicle. Pigments can be in any of a variety of colors and are exemplified by those delineated in the examples herein.

Dot gain is herein defined as the expansion of the image (sub)components after application of same to the print substrate. This decreases detail clarity, and thus minimal dot gain is typically more desirable for higher clarity images.

The variety of 2, 5-bis (preferably unsaturated) fatty acid esters of 1,4-bis oxa-2,5-cyclohexadiene-2,5-diols, (meth) acrylate esters, and vinyl or allyl ethers, useful in the practice of this invention is very large, however for the sake of brevity, only 10 examples of preferred members of each class of materials are provided in Tables A through C. The examples provided hereinafter are intended to be illustrative of, and not to exhaustive of nor to limit the scope of this invention. Those skilled in the art will easily be able to provide many more examples of each class of such components with minimal difficulty, and without departing from the teachings of this invention.

An ink vehicle is a combination of components that are suitable for ink compositions. In one aspect, the ink vehicle contains certain components that are incompatible for storage with other ink components (i.e., when in contact, an irreversible reaction takes place, which may be undesirable or may be desired to be controlled such that the reaction takes place immediately prior to, or concurrent with, use of the resulting product (e.g., ink) for printing). In such instance, one of the incompatible components is placed in the ink vehicle and the other is placed in a second ink vehicle (e.g., fountain solution) for mixing immediately prior to, or concurrent with, use. The ink vehicle can include any of the materials delineated herein, or can also include any standard ink vehicle component know in the art, including for example, solids, alkyds, polyesters or polyamides suitable for ink or printing compositions, and the like. The same material can be considered a varnish or coating when pigments are absent from the composition. Varnishes are expressly considered one aspect of the compositions delineated herein.

The compositions herein are useful in lithographic printing applications. Such applications can be intaglio or off-set, including sheet-fed, cold-web, and heat set web printing. The teachings of this invention are beneficial and applicable in the practice of letterpress, sheetfed, heatset and coldset forms of lithography; providing in each instance the opportunity to achieve faster production of improved products.

The number and variety of nascent free radical sources, useful in the practice of this invention is very large, however for the sake of brevity, only 10 examples of sources are provided, cf. Table A. Those nascent peracid salts useful in conjunction with a specific lithographic printing press configuration may be selected, in part, by the means of activation available. For example the absence of a radiant energy source would preclude the utility of a radiation-activated system, and/or the use of single fluid, dry plate lithography would preclude the applicability of water and/or chemically activated systems.

Other embodiments of the invention include those specifically delineated in the tables and examples herein. The examples provided hereinafter are intended to be illustrative of, and not to limit the scope of this invention

EXAMPLES

TABLE A

| Material Designation | Peroxy acid salt | Incorporated into Ink (I) or Fountain Solution (F) | Preferred activation methodology |
|---|---|---|---|
| AA | sodium peroxy diphosphate | I or F | water. |
| AB | sodium perborate | I or F | water |
| AC | sodium persulfate | I or F | thermal, |
| AD | sodium peroxy disulfate | I or F | thermal, |
| AE | calcium perphthalate | I or F | thermal, or radiation |
| AF | Aluminum percarbonate | I or F | Water, or thermal. |
| AG | Potassium perhenate | I | Thermal, radiation, |
| AH | Potassium permanganate | I | thermal, or radiation |
| AI | magnesium per t-butoxide | I | water |
| AJ | sodium peracetate | I or F | thermal, radiation |

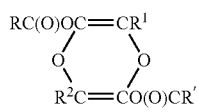

Formula A

Wherein R and R', are each independently chosen from among 3 to 30 carbon saturated or unsaturated monovalent hydrocarbyl or oxyhydrocarbyl ligands. $R^1$ and $R^2$ are each independently chosen from among hydrogen, and one to seven carbon saturated, aromatic or unsaturated monovalent hydrocarbyl ligands.

TABLE B

Material designation 1,4 bis oxa cyclohexadiene-2,5-bis ester

| | |
|---|---|
| BA | 3,6-bis methyl, bis linolenate |
| BB | 2-butenoate, ricinoleate |
| BC | 3-(2-butenyl) bis 6,8-undecadienoate |
| BD | Arachidonate, myristoleate |
| BE | n-octanoate, 2-propenoate |
| BF | 3,6-bis phenyl, crotonate, laurate |
| BG | 3-methyl-6-hexyl, bis isovalerate, |
| BH | Pelargonate, versalate |
| BI | 3,6-bis methyl, bis tung oil fatty ester. |
| BJ | 3-t-butyl,, 2-behenolate, 6-(2-methyl)-2-propenolate |

TABLE C

| | |
|---|---|
| CA | Multifunctional (meth)acrylates/vinyl ethers |
| CB | sorbitan tetra methacrylate |
| CC | Tris allyl trimelitate |
| CD | tetrakis methylol acetone bis acrylate, undecanoate |
| CE | 2,3,2',3'-tetrakis acrylato bis propyl ether |
| CF | Tris methylol propane tris methacrylate |
| CG | 1,2,4-cyclohexane tris acrylate |
| CH | 2,5-furfuryl bis acrylate |
| CI | Bis pentaerythritol tetrakis vinyl ether (mixed isomers) |
| CJ | n-hexanol 1,2-tris vinyl ether |

Example 1

Method for the Preparation of 1,4-bis oxa-2,5-cyclohexadiene Bis Esters (Bis Vinyl Esters)

One mole of 2,5-bis oxo-1,4-dioxane, was dissolved in 2 liters of trimethyl cyclohexane, 0.5 grams of tetra isopropyl titanate was added and the resulting solution heated to, well stirred, and maintained at 160+/−5° C. under nitrogen sparge, during the addition, over a four hour period of 2 moles of methyl linolenate, and for an additional three hours thereafter. 1.92 moles of methanol (identity confirmed via gas chromatography) were collected, via distillation, during the heating period. Analysis of the resulting product by high pressure liquid chromatography (HLPC)-mass spectroscopy (MS), and Fourier transform infra-red spectroscopy (FTIR), indicated that 98 percent of the dioxane and that 96 of the methyl linolenate had been consumed respectively to produce a 91 mole % yield of the desired bis ester (R1 and R2 each=H, R and R' each=$C_{17}H_{29}$). Similarly prepared were a variety of analogs. Those analogs in which the two acyl ligands were dissimilar were produced via sequential addition of the acyl components, with a two hour equilibration period between acyl component type additions The respective yields of the named product(s) (Isolated by preparative HLPC, and identified by MS and FTIR) are documented in Table 1.

TABLE 1

| Major product | 1,4-bis oxa-cyclohexane-2,5-dione | Acylate 1 | Acylate 2 | Yield Mole % |
|---|---|---|---|---|
| BA | 3,6-bis methyl | isopropyl linolenate | same | 94 |
| BB | | methyl iso octadieneoate | ethyl ricinoleate | 37[a] |
| BC | 3-(2-butenyl) | methyl 6,8-undecadieneoate | same | 89 |
| BD | 3-methyl | isopropyl arachidonate | methyl mysteroleate | 42[a] |
| BE | | methyl octanoate | t-butyl 2-propenoate | 44[a] |
| BF | 3,6-bis phenyl | methyl crotonate | ethyl laurate | 47[a] |
| BG | 2-methyl-5-hexyl | ethyl isovalerate | same | 81 |
| BH | | methyl pelagonate | versalic acid | 87 |
| BI | 3,6-bis methyl | tung oil fatty acid, | same | 83[b] |
| BJ | 3-t-butyl, | isopropyl 2-methyl-2-propenoate | behenolinic acid | 52[a] |

Notes:
[a] mixed acylate bis ester, total bis acylate yield >75%.
[b] total (mixed) fatty acylate bis esters.

Example 2

Incorporation of Minor Proportions of Multifunctional (Meth)Acrylates and or Vinyl and/or Allyl Ethers, as (Partial/Complete Solvent Replacements in Dual Fluid Lithographic Sheetfed Inks.

Blue sheet fed litho inks were prepared by mechanically admixing and three roll milling (to a Hegman grind of 7+) 345 g of Halite, 295 g of 3010 (Lawter Chemical Co., tung-linseed oil based gloss varnishes), 160 g of phthalocyanine blue pigment (No. Ciba Specialty Chemical Co.), 150 g of conventional diluent, or VOC free reactive diluent (s) replacement, as specified in Table 2, 6 g of polytetrafluoro ethylene powder (Micro Powders-Fluoro 60), 2 g each of 12% cobalt, and 12% manganese naphthenates. Optionally accelerator, as specified, was added to the indicated fluid. Ink tack was adjusted to 11 at 800 RPM, via the addition of 40 g of a combination of Exxate 200, diluent as specified, and/or 3020 (Lawter Chemical Co. tung-linseed oil based gloss varnish).

The resulting inks were each separately evaluated by printing, using a 300 line screen at normal density of 120 on an Xrite densitometer, on a chrome coated 35 kg. paper stock, using a Komori 300×450 mm sheetfed press, @ 9,000 impressions per hour, using Vam Corp.'s Total (fountain solution concentrate) @ 80 g. per liter, and the minimal proportion of isopropanol, as a fountain additive, required to eliminate scumming. The resulting prints were each evaluated for drying rates, dot gain. Print yield (mileage), minimum fountain solvent requirements, maximum stack height prior to visible offset and VOC values were also determined, and documented in Table 2.

TABLE 2

| ID | Diluent(s)-% | Accelerator-ppm/I or F | Minimum % fountain alcohol req. | Total VOC g/kg ink | Mileage $10^3 m^2/g$ ink | % Dot Gain | Max. Stack Cm | Through Dry Time hour |
|---|---|---|---|---|---|---|---|---|
| 2A | Exxate 200-15 | none | 8.5 | 188 | 0.76 | 26 | 42 | 21 |
| 2B | Exxate 200-15 | AA-5000/I | 8.5 | 188 | 0.73 | 24 | 42 | 16 |
| 2C | BA-10 | none | none | 7 | 1.06 | 5 | 60 | 13 |
| 2D | BA-10 | AA-500/I | none | 7 | 1.04 | 3.5 | 65 | 9 |
| 2E | BE-7 | none | none | 6 | 1.02 | 5.5 | 55 | 15 |
| 2E | BE-7 | $H_2O_2$-1,000/F | none | 6 | 1.01 | 5.5 | 55 | 18 |
| 2F | BE-7 | AB-80/I | none | 6 | 1.02 | 5.5 | 55 | 15 |
| 2G | BI-3, CB-7 | AD-1,250/F | none | 3 | 1.11 | 4.9 | 75 | 6 |
| 2H | CD-9 | none | 2 | 25 | 0.98 | 7.8 | 55 | 13 |
| 2I | CH-12 | AF-15/I | 1 | 14 | 0.96 | 8.2 | 60 | 10 |
| 2J | Exxate 200-7 BB-4 | AA-5000/I | 3.2 | 75 | 0.86 | 14 | 48 | 13 |

Benefits demonstrated include: reduced dot gain, faster drying, reduced/virtual elimination of VOCs, enhanced print stacking tolerance.

Example 3

Incorporation of Minor Proportions of Multifunctional (Meth)Acrylates and or Vinyl and/or Allyl Ethers, as (Partial/Complete Solvent Replacements in Single Fluid Lithographic Cold Web (Substrate Moisture-Humidity Activated) Inks.

Black, single fluid, cold web litho inks were prepared by mechanically dispersing and filtering ((through a 5 micron filter) 400 g of Ultrex 110, 300 g of Nylin 5(Lawter Chemical Co., tung-linseed oil based gloss ink vehicles), 140 g of black pigment (No. R400R Cabot Corp.), 7 g of reflex blue pigment (BASF) 105 g of conventional diluent, or VOC free reactive diluent(s) replacement, as specified in Table 3, 4 g of polyethylene wax paste (No. Shamrock Industries), and 3 g of polytetrafluoro ethylene powder (Micro Powders-Fluoro 60). Optionally accelerator, as specified, was added to the ink. Tack was adjusted to 8 at 800 RPM, via the addition of 40 g of a combination of diglyme, diluent as specified, and/or 3020 (Lawter Chemical Co. tung-linseed oil based gloss varnish).

The resulting inks were each separately evaluated by printing, using a 200-line screen at standard densities, on a calendared, uncoated 25 kg. paper stock, employing a Goss, 1 meter web press, using Toyo silicone plates press, at maximum (drying rate, or press capability production rates-19,000 impressions/hr.) The resulting prints were each evaluated for drying rates, dot gain. Print yield (mileage), requirements, minimum compression (psi) necessary to effect visually detectable offset, and VOC values were also determined, and documented in Table 3. Substrate and printing local were both maintained at 22° C. and 60% relative humidity, during printing.

TABLE 3

| ID | Diluent(s)-% | Accelerator-ppm | Total VOC g/kg ink | Mileage $10^3 m^2/g$ ink | % Dot Gain | Max. Comp. Psi × 100 | Max print rate K |
|---|---|---|---|---|---|---|---|
| 3A | Propylene glycol-22 | none | 232 | 0.59 | 31 | 0.65 | 12.7 |
| 3B | Propylene glycol-22 | AE-1,000 | 234 | 0.61 | 27 | 0.95 | 14.9 |
| 3C | Butyl triglycol-25 | none | 257 | 0.53 | 25 | 0.73 | 13.7 |
| 3D | Butoxy triglycol-25 | AF-250 | 262 | 0.54 | 23 | 0.80 | 15.4 |
| 3F | BF-9, CF-11 | none | 9 | 0.89 | 7 | 1.2 | 18.7 |
| 3G | BF-6, CF-11 | AE-500 | 9 | 0.89 | 8 | >2.5 | >19 |
| 3H | BG-19 | AI-70 | 10 | 0.87 | 6 | >2.5 | >19 |
| 3I | CH-22 | AG-40 | 7 | 0.79 | 8 | 1.8 | 18.6 |
| 3J | BC-17 | AA-600 | 5 | 0.91 | 7 | >2.5 | >19 |

Benefits demonstrated include: reduced dot gain, faster drying (enabling higher print rates), reduced/virtual elimination of VOCs, enhanced print pressure tolerance.

Example 4

Incorporation of Minor Proportions of Multifunctional (Meth)Acrylates and or Vinyl and/or Allyl Ethers, as (Partial/Complete Solvent Replacements in Lithographic Heatset Web Inks.

Yellow, red, cyan and black, litho heatset inks were prepared by mechanically dispersing and filtering (through a 5 micron filter) 400 g of A-1407, 300 g of Ultrex 110 (Lawter Chemical Co., tung-linseed oil based gloss ink vehicles), 140 g of pigment 250 g of conventional diluent, or VOC free reactive diluent(s) replacement, as specified in Table 3, 4 g of polyethylene wax paste (No. Shamrock Industries), 20 g of Aluminum carbonate, and 3 g of polytetrafluoro ethylene powder (Micro Powders-Fluoro 60). Optionally accelerator, as specified, was added to the ink. Tack was adjusted to 8 at 800 RPM, via the addition of 40 g of a combination of Exxate 200, diluent as specified, and/or 3020 (Lawter Chemical Co. tung-linseed oil based gloss varnish).

The resulting inks were each collectively evaluated by two-sided four color printing, using a 200-line screen at standard densities, on a coated 25 kg. paper stock, employing a Goss 1 meter web heatset press, conventional plates, a fountain solution containing 20 g/l of Lithofont fountain solution conc (2-3%), and the minimum of IPA required to prevent scumming; and a 9 meter 160° C. oven equipped with a 5° C. chill roll, at maximum (drying rate, or press capability limited production rates-22,000 impressions/hr.) The resulting prints were each evaluated for drying rates, dot gain. Print yield (average color mileage), minimum compression (psi) necessary to effect visually detectable offset, and VOC values were also determined. These are documented in Table 4.

TABLE 4

| ID | Diluent(s)-% | Accelerator-ppm | Total VOC g/kg ink | Average Mileage $10^3 m^2$/g ink | % Dot Gain | Max. Comp. Psi × 100 | Max print rate K |
|---|---|---|---|---|---|---|---|
| 4A | Exxate 200-25 | none | 282 | 0.79 | 31 | 1.65 | 17.7 |
| 4B | Exxate 200-25 | AE-1,000 | 284 | 0.81 | 27 | 1.93 | 18.9 |
| 4C | Exxate 200-25 | t-butyl peroxide-1,000 | 297 | 0.77 | 30 | 1.65 | 18.1 |
| 4D | Methyl linoleate-25 | AF-250 | 185 | 0.74 | 24 | 0.80 | 18.4 |
| 4F | BF-9, CF-11 | none | 9 | 0.86 | 6 | 2.2 | 21.7 |
| 4G | BJ-6, CC-11 | AE-500 | 9 | 0.88 | 8 | >2.5 | >22 |
| 4H | BG-19 | AI-70 | 10 | 0.91 | 5 | >2.5 | >22 |
| 4I | CI-22 | AG-40 | 7 | 0.89 | 9 | 1.8 | 20.6 |
| 4J | BC-17 | AA-600 | 5 | 0.92 | 8 | >2.5 | >22 |

Benefits demonstrated include: reduced dot gain, faster drying (enabling higher print rates), reduced/virtual elimination of VOCs, enhanced print stacking tolerance.

The compounds of this invention (including as used in compositions herein) may contain one or more asymmetric centers and thus occur as racemates and racemic mixtures, single enantiomers, individual diastereomers and diastereomeric mixtures. E-, Z- and cis-trans-double bond isomers are envisioned as well. All such isomeric forms of these compounds are expressly included in the present invention. The compounds of this invention may also be represented in multiple tautomeric forms, in such instances, the invention expressly includes all tautomeric forms of the compounds described herein. All such isomeric forms of such compounds are expressly included in the present invention. All crystal forms of the compounds described herein are expressly included in the present invention.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

All references cited herein, whether in print, electronic, computer readable storage media or other form, are expressly incorporated by reference in their entirety, including but not limited to, abstracts, articles, journals, publications, texts, treatises, internet web sites, databases, patents, and patent publications.

A number of embodiments of the invention have been described. Nevertheless, it will be understood that various modifications may be made without departing from the spirit and scope of the invention. Accordingly, other embodiments are within the scope of the following claims.

What is claimed is:

1. A composition comprising 2,5-bis fatty acid esters of 1,4-bis oxa-2,5-cyclohexadiene-2,5-diols, and any of multifunctional (meth)acrylates, and vinyl ethers, or a combination thereof, wherein the amount of (meth)acrylate is less than 10 weight percent of the total composition.

2. The composition of claim 1 comprising a minimum of about 2% and a maximum of about 30 weight percent of a combination of 2,5-bis fatty acid esters of 1,4-bis oxa-2,5-cyclohexadiene-2,5-diols, and any of multifunctional (meth)acrylates, vinyl ethers, or a combination thereof.

3. The composition of claim 1, comprising a 2,5-bis unsaturated fatty acid ester of 1,4-bis oxa-2,5-cyclohexadiene-2,5-diol.

4. The composition of claim 1, further comprising an inorganic salt of a peracid.

5. The composition of claim 4, comprising from about 10 to about 5,000 parts per million (ppm) of an inorganic salt of a peracid.

6. The composition of claim 3, comprising from about 10 to about 5,000 parts per million (ppm) of an inorganic salt of a peracid.

7. An ink comprising the composition of claim 1.

8. The ink of claim 7, further comprising pigments.

9. A method of printing comprising using an ink of claim 7.

10. The method of claim 9, wherein the printing comprises applying the ink to a press.

11. The method of claim 9, wherein the printing is lithographic printing.

12. The method of claim 9, wherein the printing comprises printing on paper.

13. A method of printing comprising using the composition of claim 7 as an ink vehicle.

14. The method of claim 13, wherein the ink vehicle is mixed with a fountain solution.

15. The method of claim 13, wherein the fountain solution further comprises an organic (hydro)peroxide and/or an inorganic salt of a peracid.

16. The composition of claim 1, further comprising one or more additional ink vehicle components.

17. The composition of claim 16, wherein the additional ink vehicle components are solids, alkyds, polyesters or polyamides.

18. The composition of claim 1, wherein the 2,5-bis unsaturated fatty acid ester of 1,4-bis oxa-2,5-cyclohexadiene-2,5-diol is a compound that is 3,6-dimethyl,di (9.12.15-) octadecatrienoate; butenoate, 9-hydroxy-11-octadecenoate; 3-(2-butenyl), di 6.8-undecadienoate; eicosanoate, 9-tetradecenoate; n-octanoate, 2-propenoate; 3,6-bis phenyl, crotonate, laurate; 3-hexyl, 6-hexyl diisopenatanoate; nonoate, pentanoate; 3.6-dimethyl, di (China wood oil derived fatty acid) esters; or 3. i-butyl, 2-docosanoate, 6 (2-methyl) 2-propenoate.

19. A composition made by the process of combining a 2,5-bis fatty acid ester of a 1,4-bis oxa-2,5-cyclohexadiene-2,5-diol, and any of multifunctional (meth)acrylates, vinyl ethers, or a combination thereof, wherein the amount of (meth)acrylate is less than 10 weight percent of the total composition.

20. The composition of claim 19, further comprising combining an inorganic salt of a peracid or an organic hydroperoxide.

* * * * *